United States Patent
Asano et al.

(10) Patent No.: US 8,960,343 B2
(45) Date of Patent: Feb. 24, 2015

(54) GRILL SHUTTER DEVICE

(71) Applicant: Aisin Seiki Kabushiki Kaisha, Kariya-shi (JP)

(72) Inventors: Yoshimasa Asano, Kariya (JP); Kenji Maeta, Kariya (JP); Kenji Hori, Toyota (JP); Takashi Saito, Toyota (JP); Yuji Suzuki, Chita-gun (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 60 days.

(21) Appl. No.: 13/845,536

(22) Filed: Mar. 18, 2013

(65) Prior Publication Data
US 2013/0248266 A1 Sep. 26, 2013

(30) Foreign Application Priority Data
Mar. 22, 2012 (JP) .................. 2012-065931

(51) Int. Cl.
*B60K 11/08* (2006.01)
*B60K 11/04* (2006.01)

(52) U.S. Cl.
CPC ............... B60K 11/04 (2013.01); *B60K 11/085* (2013.01)
USPC ...................................... 180/68.1; 296/193.1

(58) Field of Classification Search
CPC ........ B60K 11/04; B60K 11/06; B60K 11/08; B60K 11/085
USPC .............................. 180/68.1, 68.2; 296/193.1
See application file for complete search history.

(56) References Cited

U.S. PATENT DOCUMENTS

| | | | | |
|---|---|---|---|---|
| 6,260,609 | B1 * | 7/2001 | Takahashi | 165/69 |
| 6,412,581 | B2 * | 7/2002 | Enomoto et al. | 180/68.4 |
| 7,108,092 | B2 | 9/2006 | Suwa et al. | |
| 7,290,630 | B2 * | 11/2007 | Maeda et al. | 180/68.4 |
| 7,451,844 | B2 * | 11/2008 | Kunikata | 180/68.1 |
| 7,766,111 | B2 * | 8/2010 | Guilfoyle et al. | 180/68.1 |
| 7,784,576 | B2 * | 8/2010 | Guilfoyle et al. | 180/68.1 |
| 8,181,727 | B2 * | 5/2012 | Ritz et al. | 180/68.1 |
| 8,347,830 | B2 * | 1/2013 | Tregnago et al. | 123/41.05 |
| 8,561,739 | B2 * | 10/2013 | Hori | 180/68.1 |
| 8,571,749 | B2 * | 10/2013 | Kawato | 701/29.2 |

(Continued)

FOREIGN PATENT DOCUMENTS

| | | |
|---|---|---|
| DE | 10 2010 002 373 A1 | 9/2011 |
| EP | 2 371 603 A1 | 10/2011 |

(Continued)

OTHER PUBLICATIONS

Extended European Search Report issued Aug. 2, 2013 in Patent Application No. 13160055.3.

*Primary Examiner* — Hau Phan
*Assistant Examiner* — Jacob Meyer
(74) *Attorney, Agent, or Firm* — Oblon, Spivak, McClelland, Maier & Neustadt, L.L.P.

(57) ABSTRACT

Provided is a grill shutter device including a shutter mechanism controlling a flow rate of air flowing into a vehicle body from the grill opening portion of the vehicle body front portion by an opening and closing operation; a frame configured to support the shutter mechanism within the grill opening portion; an actuator that is held in the frame and performs the opening and closing driving of the shutter mechanism; and a holding structure capable of relatively moving the actuator to the front side of the frame, based on the collision load at the time of the vehicle collision.

17 Claims, 13 Drawing Sheets

(56) References Cited

U.S. PATENT DOCUMENTS

| | | | |
|---|---|---|---|
| 8,645,028 B2* | 2/2014 | Mochizuki | 701/49 |
| 8,646,552 B2* | 2/2014 | Evans et al. | 180/68.1 |
| 8,689,917 B2* | 4/2014 | Miesterfeld et al. | 180/68.1 |
| 8,708,077 B2* | 4/2014 | Hori | 180/68.1 |
| 8,752,886 B2* | 6/2014 | Wirth et al. | 296/193.09 |
| 2004/0178664 A1* | 9/2004 | Hyuga | 296/193.1 |
| 2005/0093341 A1* | 5/2005 | Aigner et al. | 296/193.1 |
| 2006/0102399 A1* | 5/2006 | Guilfoyle et al. | 180/68.1 |
| 2009/0050385 A1* | 2/2009 | Guilfoyle et al. | 180/68.1 |
| 2011/0203861 A1* | 8/2011 | Charnesky et al. | 180/68.1 |
| 2013/0012115 A1* | 1/2013 | Schwarz et al. | 454/155 |
| 2013/0126253 A1* | 5/2013 | Saito et al. | 180/68.1 |
| 2013/0220577 A1* | 8/2013 | Bignon et al. | 165/98 |
| 2014/0084624 A1* | 3/2014 | Kojima et al. | 296/180.1 |
| 2014/0090911 A1* | 4/2014 | Oota | 180/68.1 |

FOREIGN PATENT DOCUMENTS

| | | |
|---|---|---|
| JP | 58-139519 | 9/1983 |
| JP | 2003-81034 | 3/2003 |

* cited by examiner

GRILL SHUTTER DEVICE

CROSS REFERENCE TO RELATED APPLICATIONS

This application is based on and claims priority under 35 U.S.C. §119 to Japanese Patent Application 2012-65931, filed on Mar. 22, 2012, the entire content of which is incorporated herein by reference.

TECHNICAL FIELD

This disclosure relates to a grill shutter device.

BACKGROUND DISCUSSION

In the related art, there have been grill shutter devices capable of controlling a flow rate of air flowing into an engine compartment from a grill opening portion, based on an opening and closing operation of a shutter mechanism provided in the grill opening portion of a vehicle body front portion (for example, see JP-UM-58-139519A (Reference 1).

That is, for example, at the time of high-speed travelling, by limiting in-flow of the air into the engine compartment in the state of closing the shutter mechanism, aerodynamic performance (for example, "Cd value" or the like) thereof can be improved. Furthermore, at the time of engine start-up, by suppressing the flow rate flowing into the radiator, the warming-up time thereof can be shortened. Moreover, when the engine temperature tends to rise, by increasing the flow rate flowing into the engine compartment in the state of opening the shutter mechanism, the engine temperature can be suitably managed.

Furthermore, in recent years, a structure has been suggested which brings a front grill provided in the vehicle body front portion back into the grill opening portion based on external force acting during collision. For example, JP 2003-81034A (Reference 2) discloses a configuration in which a load transmission member is provided on the back surface of the front grill, and the collision load is transmitted to an accommodation device in the engine compartment such as a radiator. Moreover, it is possible to rapidly absorb the collision load and effectively alleviate the impact by adopting such a structure.

However, such an impact alleviation structure obtains high efficiency, on the other hand, there is a possibility that the accommodation device in the engine compartment may be influenced even when the collision load is relatively small, and there is a problem in that a labor and a time required for the repair and the exchange thereof, the cost or the like is a burden to a consumer. Moreover, in a vehicle including the grill shutter device, at the time of the vehicle collision, there is also a possibility that the grill shutter device behaves like the load transmission member in the related art, and thus the same problem may occur. Accordingly, in this respect, a compartment for improvement is further left.

A need thus exists for a grill shutter device which is not susceptible to the drawback mentioned above.

SUMMARY

In order to solve the above-mentioned problems, a grill shutter device configured to be placed to a grill opening portion of a vehicle body front portion including: a shutter mechanism controlling a flow rate of air flowing into a vehicle body from the grill opening portion of the vehicle body front portion by an opening and closing operation; a frame configured to support the shutter mechanism within the grill opening portion; an actuator that is held in the frame and performs the opening and closing driving of the shutter mechanism; and a holding structure capable of relatively moving the actuator to the front side of the frame, based on the collision load at the time of the vehicle collision.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment in which this disclosure is embodied will be explained with reference to the attached drawings.

Figure 1:
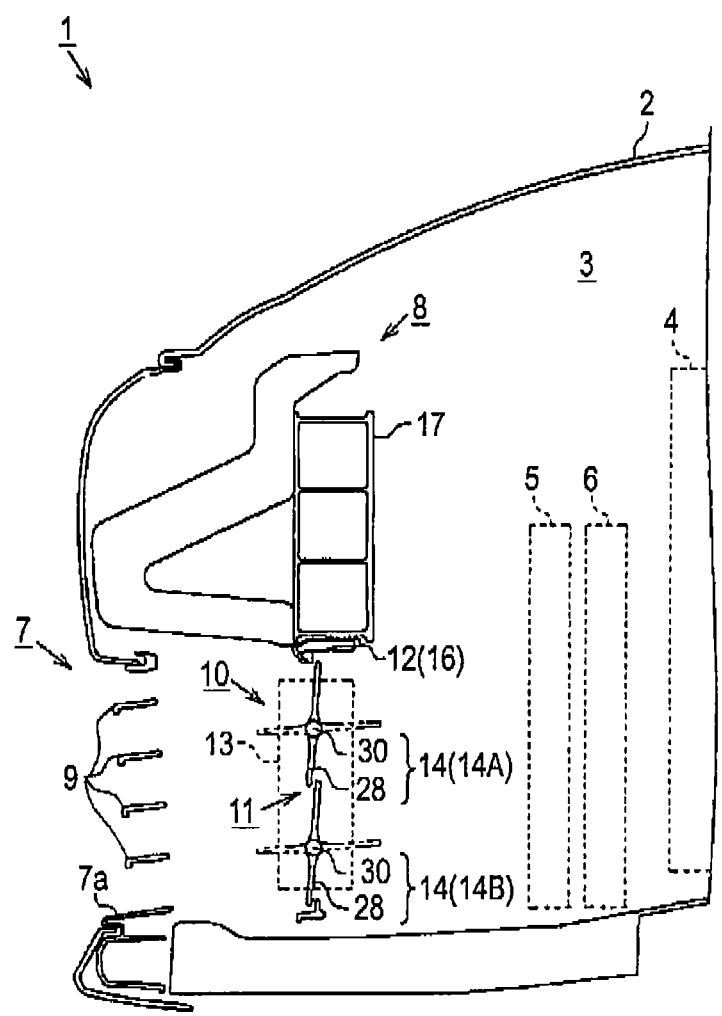
FIG. 1 is a schematic view that shows a schematic configuration of a vehicle equipped with a grill shutter device according to an embodiment disclosed here.

In a vehicle 1 shown in FIG. 1, in an engine compartment 3 formed inside a vehicle body 2, a radiator 5 for cooling an engine 4 thereof is accommodated. Furthermore, in a front portion (a left end portion in FIG. 1) of the vehicle body 2, a grill opening portion 7 is formed through which an outer space of the front of the vehicle and an inner space of the vehicle body 2 communicate with each other. Moreover, the radiator 5 is placed ahead of the engine 4 so that the air flowing into the engine compartment 3 from the grill opening portion 7 hits thereon.

Furthermore, a fan 6 is provided behind (a right side in FIG. 1) the radiator 5. Moreover, the fan 6 rotates, whereby the air effectively flows through the radiator 5.

In the present embodiment, the grill opening portion 7 is formed below a bumper 8. Furthermore, a front grill 9 constituting a design surface (a lower grill) thereof is affixed to an opening end 7a of the grill opening portion 7. Moreover, the vehicle 1 of the present embodiment includes a grill shutter device 10 capable of controlling the flow rate of the air flowing into the engine compartment 3 from the grill opening portion 7.

Specifically, the grill shutter device 10 includes a shutter mechanism 11 capable of controlling the flow rate of the air based on the opening and closing operation, a frame 12 as a structure that supports the shutter mechanism 11 within the grill opening portion 7, and an actuator 13 that is held in the frame 12 and performs the opening and closing driving of the shutter mechanism 11.

Figure 2:
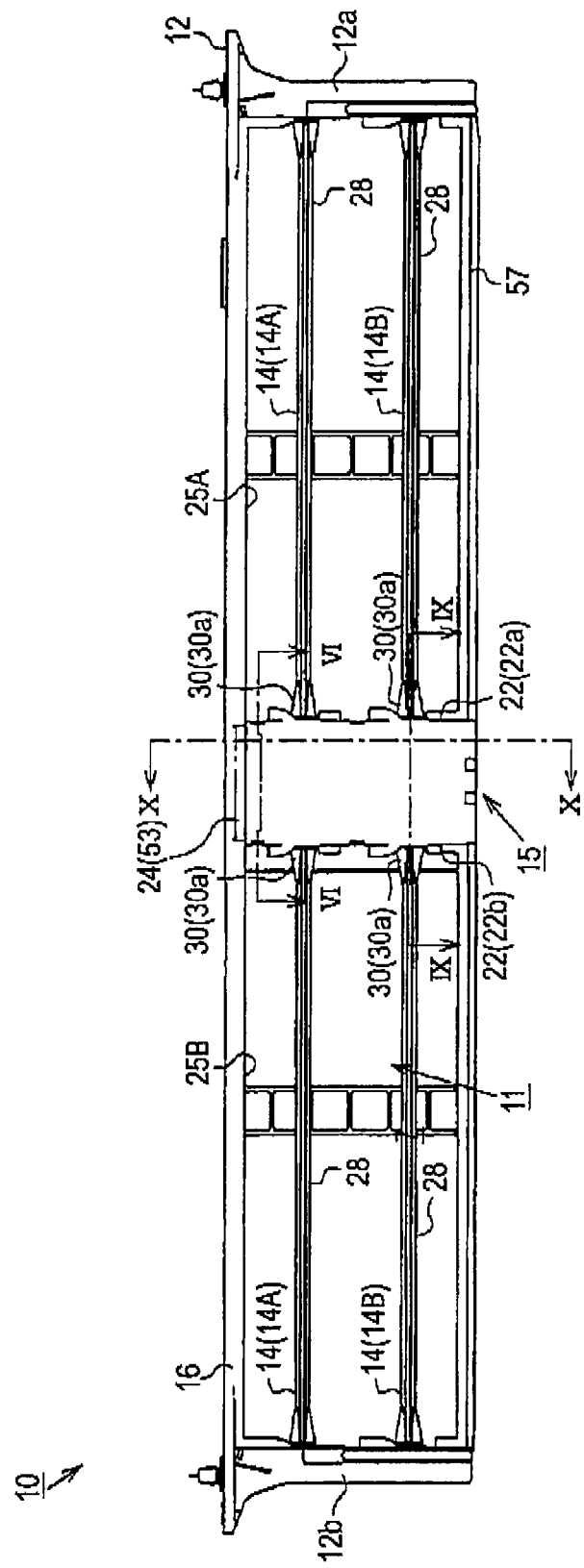
FIG. 2 is a front view of the grill shutter device.

As shown in FIG. 2, the frame 12 is formed in a substantially laterally long square framework shape extending in a width direction of the vehicle body 2. Furthermore, the shutter mechanism 11 is formed by arranging and placing a plurality of movable fins 14 within the framework of the frame 12. Furthermore, the frame 12 is provided with an actuator holding portion 15 that holds the actuator 13. Furthermore, in the grill shutter device 10 of the present embodiment, most of the frame 12 and the shutter mechanism 11 are formed by resin. Moreover, as shown in FIG. 1, the frame 12 is placed within the grill opening portion 7 by fixing an upper framework portion 16 thereof to a bumper reinforcement 17.

Figure 3:
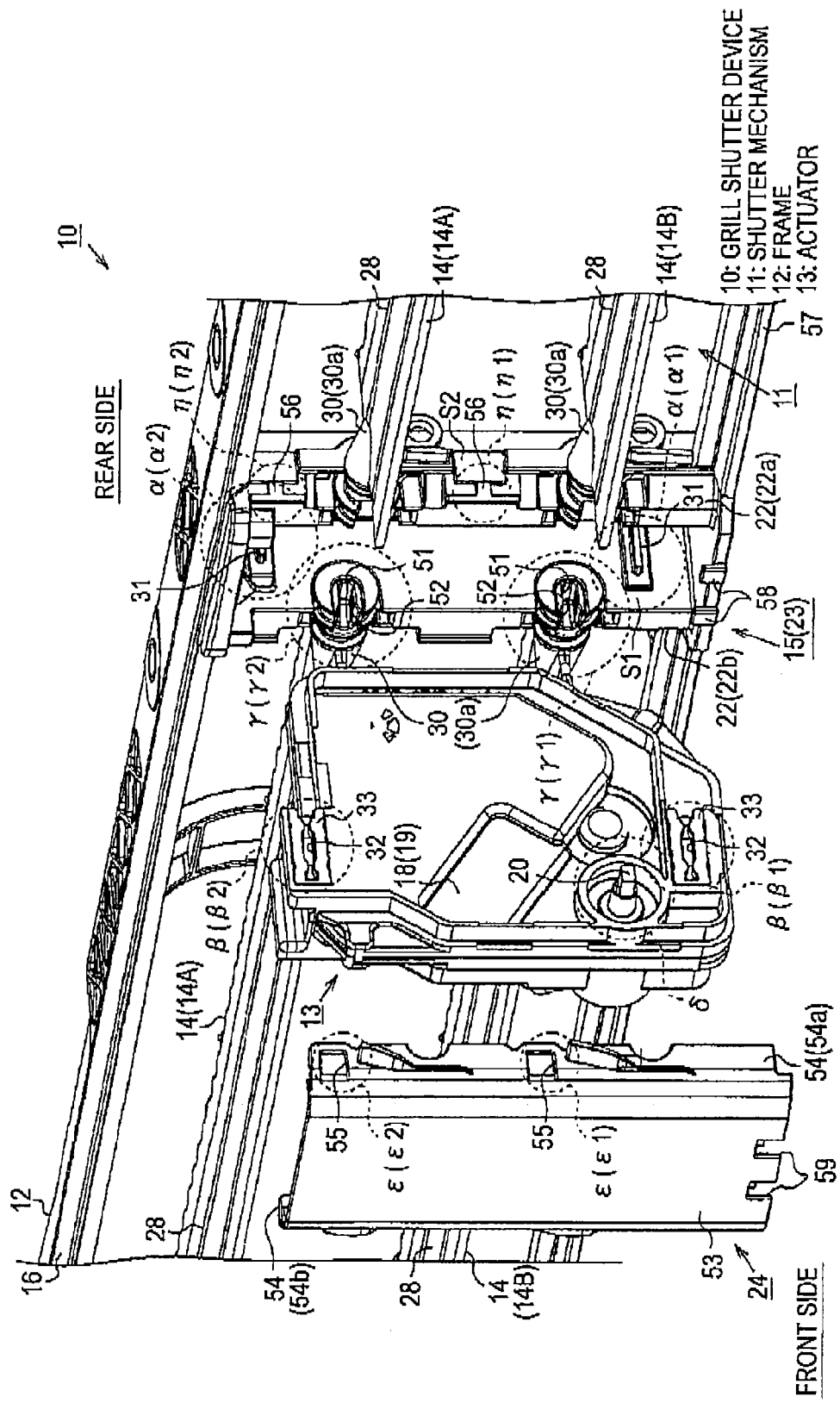
FIG. 3 is an assembly view of the grill shutter device.

Furthermore, specifically, as shown in FIG. 3, the actuator 13 of the present embodiment is formed by accommodating a motor, a decelerator or the like (not shown) within a flat box-like case 18. Furthermore, the actuator 13 includes an output shaft 20, both end portions of which project from a side plate portion 19 of the two surfaces thereof. Moreover, there is provided a configuration in which the actuator 13 is held in the frame 12 so that the extension direction of the output shaft 20 follows the width direction (see FIG. 2, a longitudinal direction) of the frame 12.

Meanwhile, the actuator holding portion 15 of the present embodiment includes a pair of side walls 22 (22a and 22b) standing substantially in parallel in a central portion in the width direction of the frame 12. Furthermore, the actuator holding portion 15 has an opening portion 23 through which the actuator 13 can pass, on the front side (see FIG. 1, the left side) of the frame 12. Moreover, the actuator 13 is mounted to the actuator holding portion 15 from the front side of the frame 12 by passing through the opening portion 23.

In addition, in the present embodiment, a cover member 24 configured to cover the front side of the actuator 13 held in the actuator holding portion 15 is affixed to the opening portion 23. Moreover, thereby, the actuator holding portion 15 of the present embodiment has a substantially columnar external form when viewed from the front (see FIG. 2).

Furthermore, as shown in FIG. 2, two left and right flow paths 25A and 25B partitioned by the actuator holding portion 15 are formed within the framework of the frame 12. Moreover, the shutter mechanism 11 includes a plurality of movable fins 14 provided in parallel in two rows within each of the flow paths 25A and 25B.

Specifically, each movable fin 14 includes a substantially long flat plate-like fin portion 28 extending in the width direction of the frame 12, and has a rotation shaft 30 that is spanned between each of the side walls 22a and 22b forming the actuator holding portion 15 and side walls 12a and 12b of the frame 12 facing the same. Furthermore, the actuator 13 held in the actuator holding portion 15 is able to open and close the shutter mechanism 11 by rotating and driving of each rotation shaft 30.

That is, as shown in FIG. 1, the shutter mechanism 11 of the present embodiment enters the opened state by the rotation of each movable fin 14 in a direction (a clockwise direction in FIG. 2) in which the fin portion 28 enters a state of being parallel to the in-flow direction of the air flowing in from the grill opening portion 7. Moreover, the shutter mechanism 11 enters the closed state by the rotation of each movable fin 14 in a direction (a counterclockwise direction in FIG. 2) in which the fin portion 28 enters a state of intersecting with the in-flow direction of the air.

The grill shutter device 10 of the present embodiment controls the rotation of each movable fin 14 using the actuator 13. Moreover, it is possible to control the flow rate of the air flowing into the engine compartment 3 from the grill opening portion 7, based on the opening and closing operation of the shutter mechanism 11 due to the rotation of each movable fin 14.

Holding Structure of Actuator

Next, the holding structure of the actuator in the grill shutter device of the present embodiment will be described.

Figure 4:
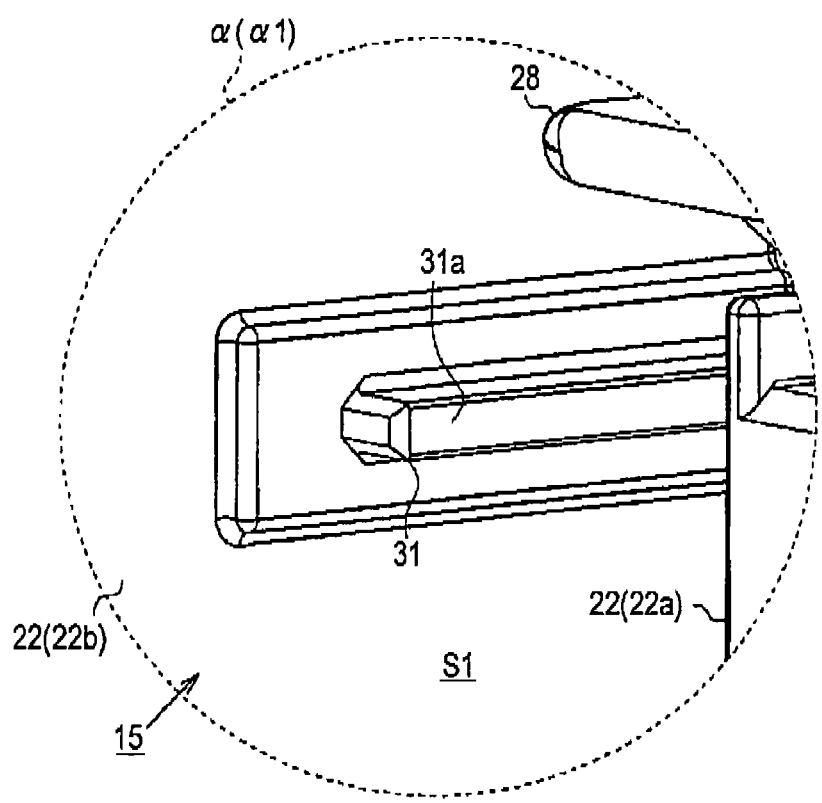
FIG. 4 is a perspective view near a protrusion portion.
Figure 5:
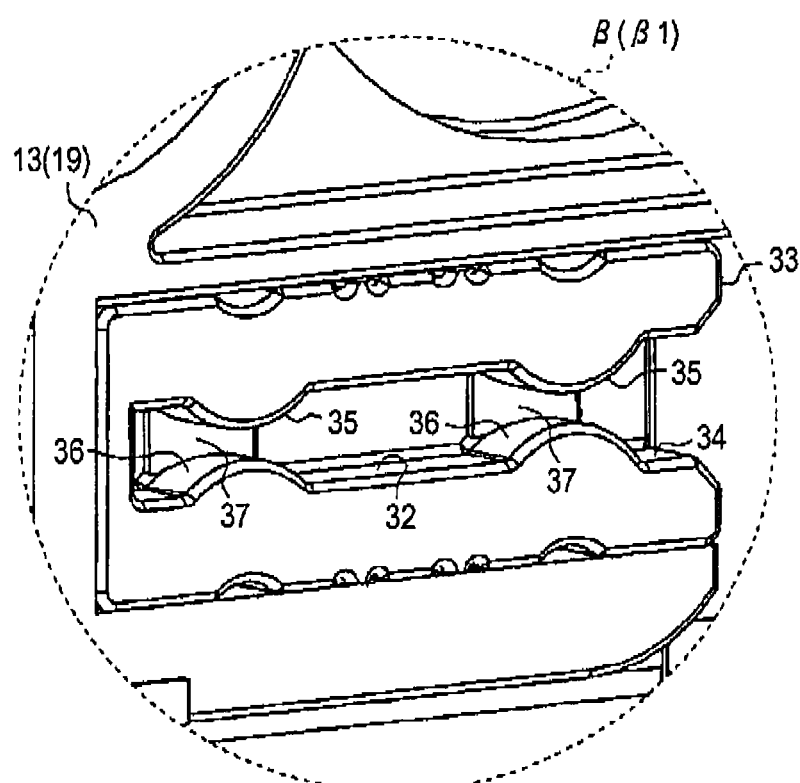
FIG. 5 is a perspective view near a connection member having a groove portion.
Figure 6:
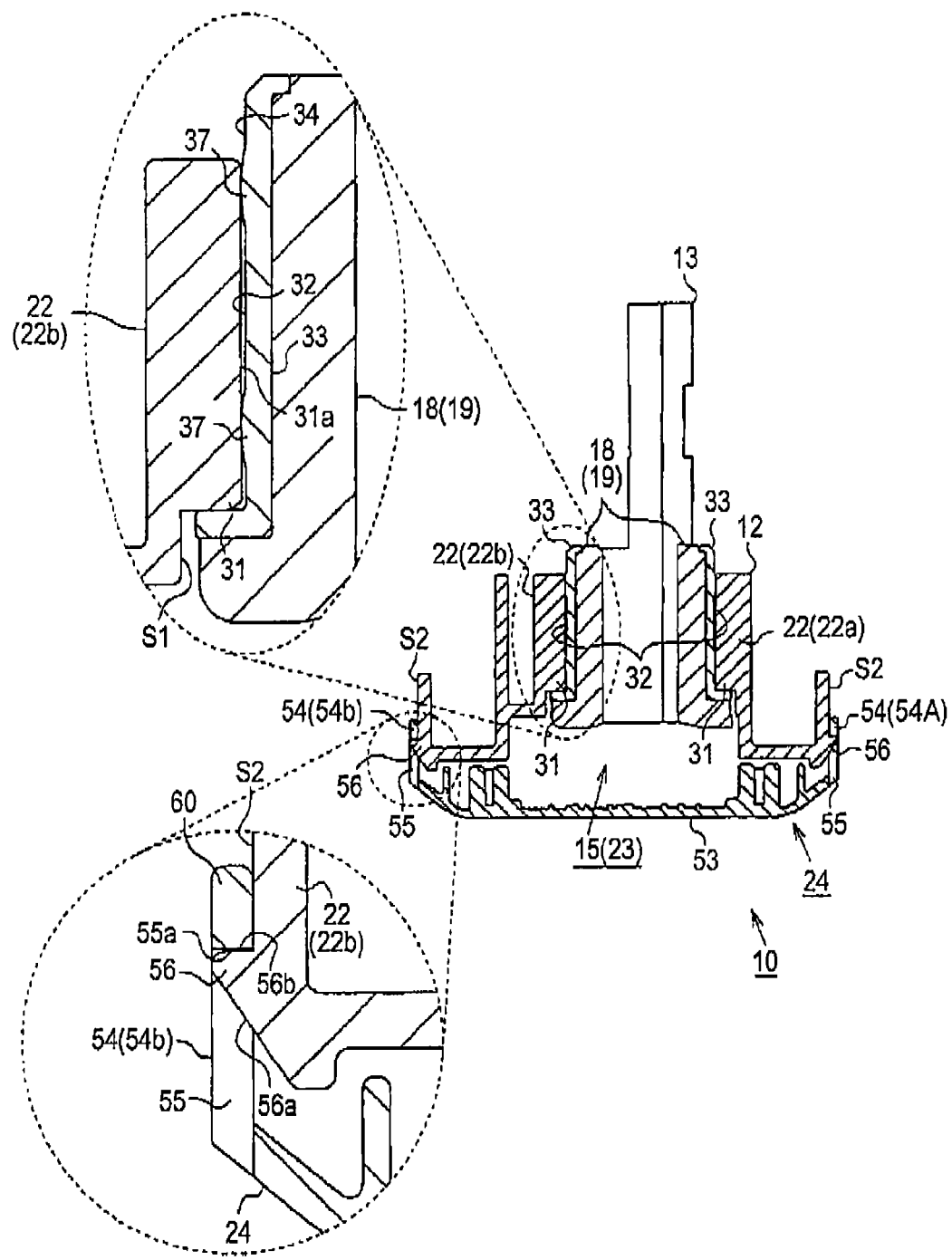
FIG. 6 is a cross-sectional view taken from a line VI-VI of the grill shutter device of FIG. 2.

As shown in FIG. 3, in the present embodiment, on inner wall surfaces S1 of each of the side walls 22a and 22b forming the actuator holding portion 15, protrusion portions 31 extending in the front-back direction of the frame 12 shown in FIG. 4 are each provided. Furthermore, as shown in FIG. 3, in the case 18 of the actuator 13, a connection member 33 having a groove portion 32, which can be fitted to the protrusion portion 31 shown in FIG. 5, is affixed to each side plate portion 19. As shown in FIG. 6, the actuator 13 of the present embodiment is inserted into the actuator holding portion 15 from the front side of the frame 12 via the opening portion 23 so that the protrusion portion 31 and the groove portion 32 are fitted to each other.

Specifically, as shown in FIG. 3, in the present embodiment, the protrusion portions 31 are provided near the upper end portion and the lower end portion (portions shown in areas α (α1 and α2) in FIG. 3) on the inner wall surface S1 of each of the side walls 22a and 22b. Furthermore, each of the connection members 33 are fixed to the vicinity of the upper end portion and the lower end portion (portions shown in areas β (β1 and β2) in FIG. 3) in each side plate portion 19 of each case 18. Furthermore, the connection member 33 of the present embodiment is formed by an elastically deformable material (resin). Moreover, as shown in FIG. 6, the relative movement of the actuator 13 with respect to the frame 12 is restricted in directions other than the front-back direction of the frame 12 in which each protrusion portion 31 extends, by fitting of each protrusion portion 31 and the groove portion 32 of each connection member 33.

Furthermore, specifically, as shown in FIG. 5, each groove portion 32 has an opening end 34 at one end (an end portion in the longitudinal direction located on the right side in FIG. 5), is fitted to each protrusion portion 31, and has projection portions 35 and 36 vertically facing each other and projecting into the groove portion so as to interpose each protrusion portion 31 therebetween. Furthermore, as shown in FIGS. 5 and 6, in each groove portion 32, a projection portion 37 pressing a top portion 31a of each fitting protrusion portion 31 in the width direction is provided. Specifically, the projection portions 35 and 36 and the projection portion 37 are each provided at a plurality of locations (two locations) in the extension direction of each groove portion 32. Moreover, in the present embodiment, thereby, constant holding force is also generated in the front-back direction (see FIG. 1, the longitudinal direction in FIG. 1) of the frame 12.

Figure 7:
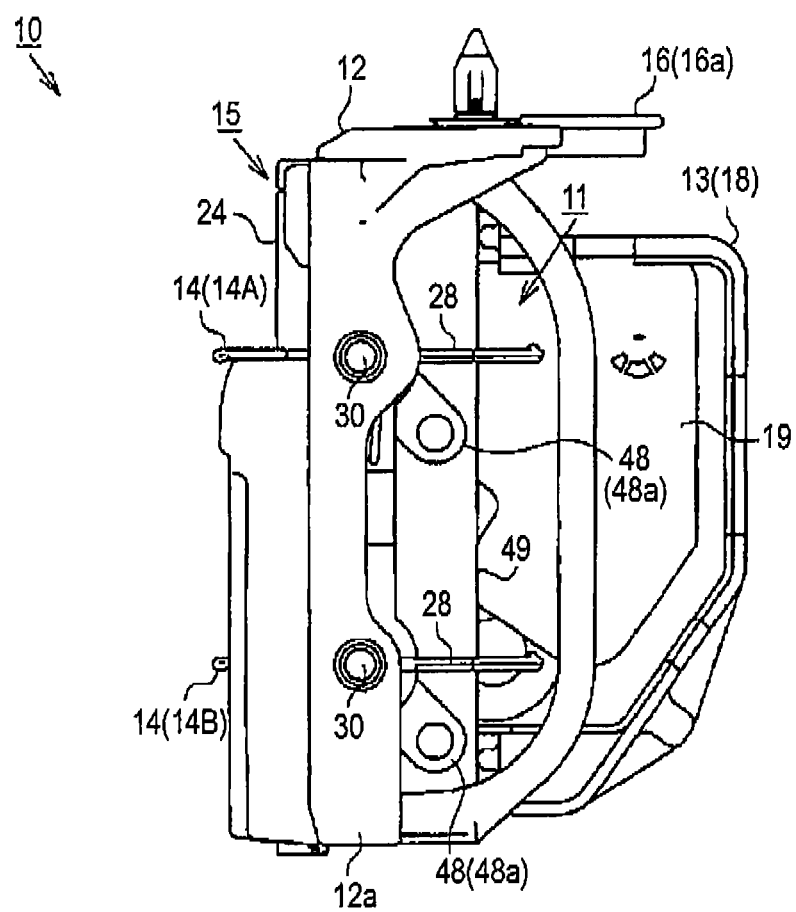
FIG. 7 is a side view of the grill shutter device.

That is, the actuator 13 of the present embodiment is mounted to the actuator holding portion 15 by the application of pressing force of an extent that can push each protrusion portion 31 of the frame 12 side into each groove portion 32 by elastically deforming each of the projection portions 35 to 37. Furthermore, as shown in FIG. 7, in the present embodiment, the actuator 13 has a portion projecting rearward rather than a rear end 16a of the upper framework portion 16 serving as the rear end portion of the frame 12, and is held in the frame 12. Moreover, force in the direction opposite to that at the time of mounting, that is, by the application of force which pulls the actuator 13 to the front side of the frame 12 in response to the holding force generated by each of the projection portions 35 and 36 and the projection portion 37, it is possible to detach the actuator 13 from the actuator holding portion 15.

Furthermore, as shown in FIG. 3, each movable fin 14 forming the shutter mechanism 11 is configured so that one end (a proximal end 30a) of the rotation shaft 30 is supported rotatably by each of the side walls 22a and 22b forming the actuator holding portion 15.

Figure 8:
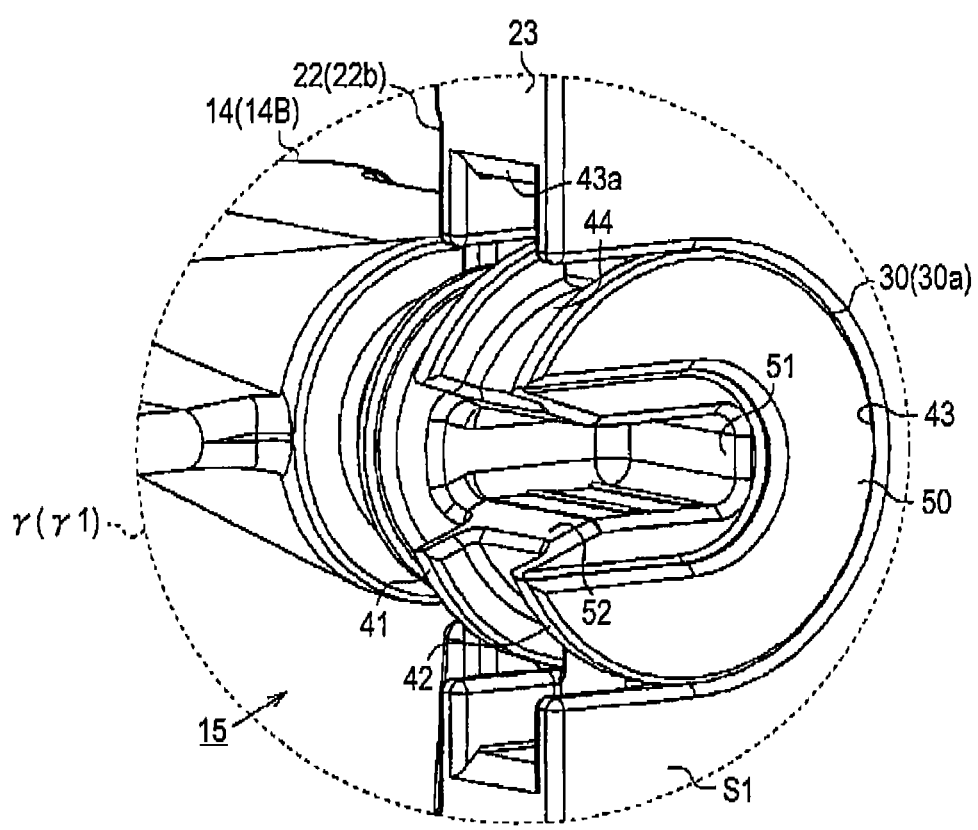
FIG. 8 is a perspective view near a proximal end of a rotation shaft.
Figure 9:
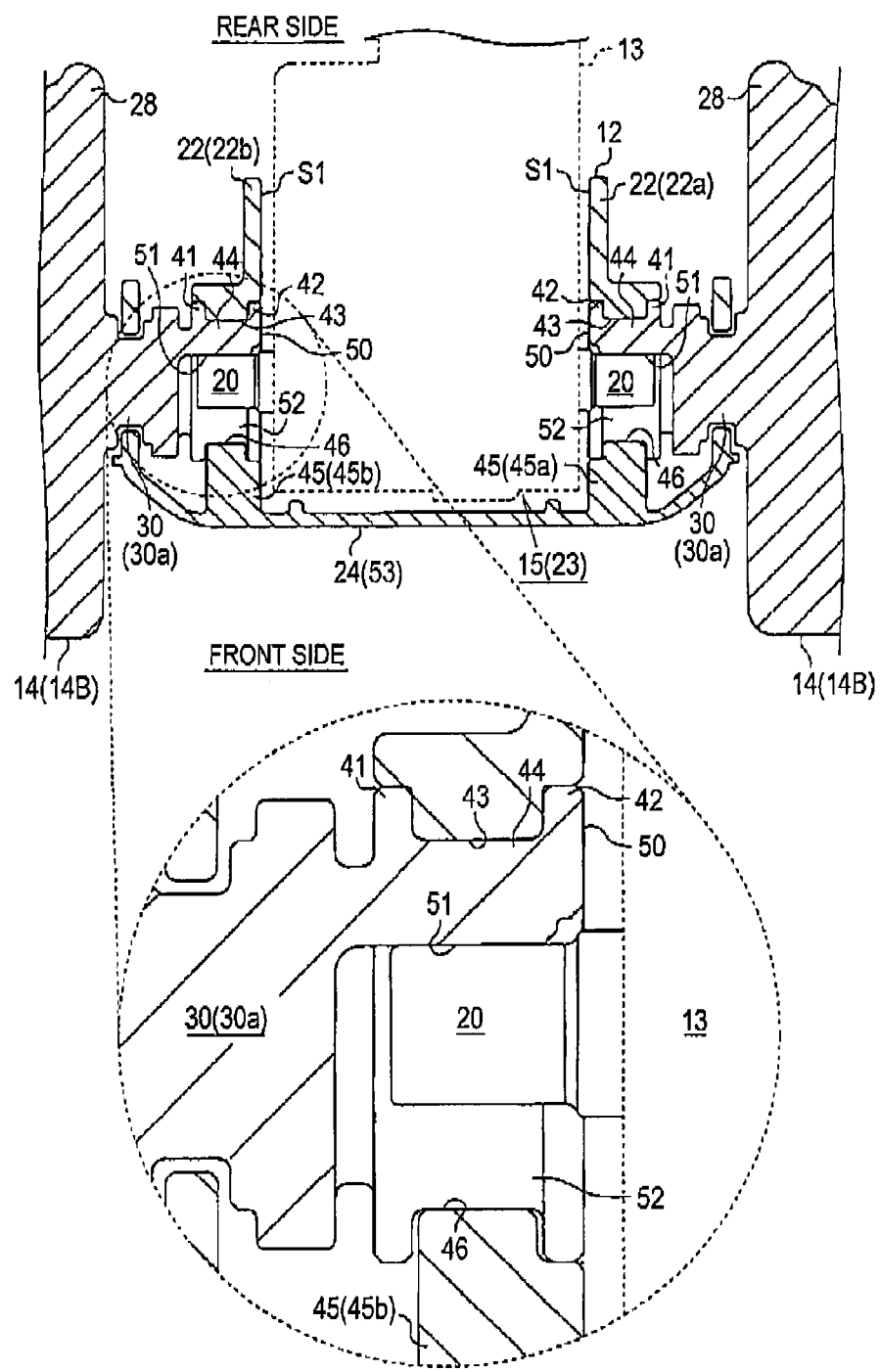
FIG. 9 is a cross-sectional view taken from a line IX-IX of the grill shutter device of FIG. 2.

Specifically, as shown in FIGS. 8 and 9, a pair of flanges 41 and 42 are provided in the proximal end 30a of each rotation shaft 30 at a predetermined interval in the axial direction. Furthermore, each side wall 22 (22a and 22b) is formed with a notch 43 opened to the front side of the frame 12 (see FIG. 3, portions shown in areas γ (γ1 and γ2)). Moreover, each movable fin 14 is affixed to the frame 12 in the manner of fitting a shaft 44 interposed between each of the flanges 41 and 42 to the bottom portion of the notch 43 formed in a substantially U shape.

Figure 10:
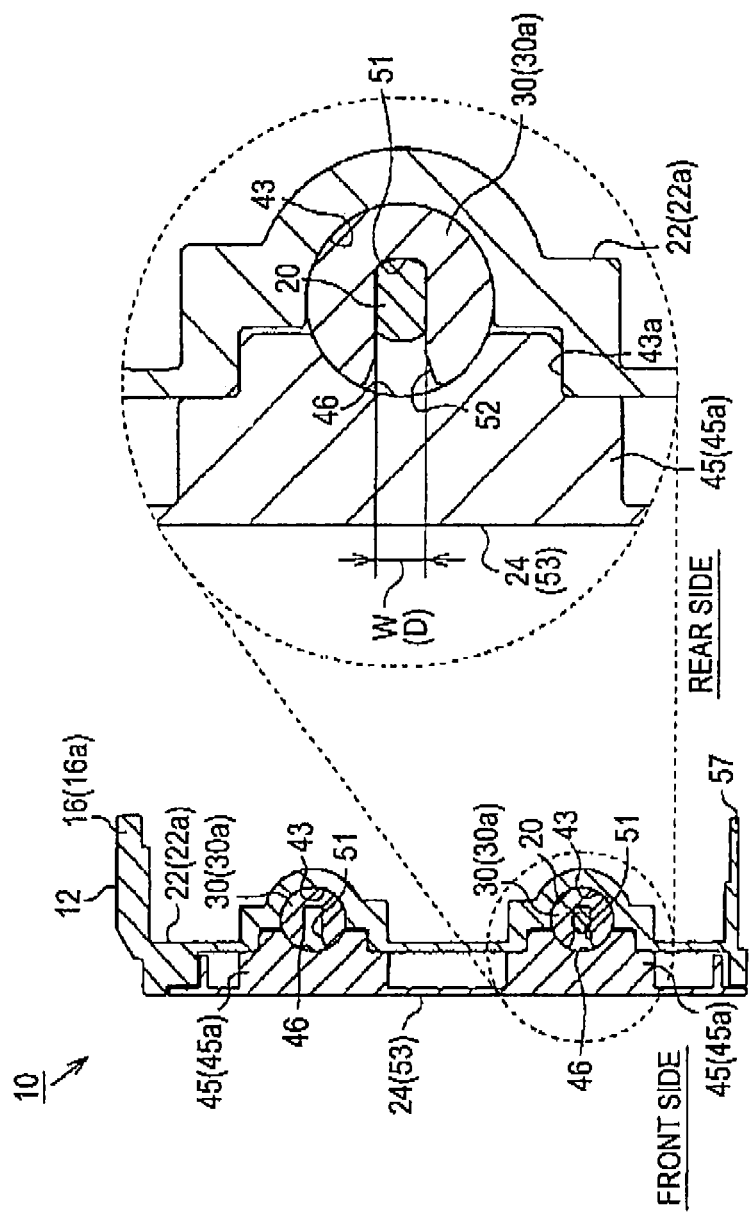
FIG. 10 is a cross-sectional view taken from a line X-X of the grill shutter device of FIG. 2.

As shown in FIGS. 9 and 10, the cover member 24 covering the front side (the lower side in FIG. 9 and the left side in FIG. 10) of the actuator holding portion 15 includes a pair of holding walls 45 (45a and 45b) provided at the positions in the width direction corresponding to each side wall 22 (22a and 22b). Moreover, each of the holding walls 45 (45a and 45b) is formed with a substantially semi-circular concave portion 46 that comes into sliding-contact with the shaft portion 44 of each rotation shaft 30 fitted to each notch 43 as mentioned above.

That is, an opening end 43a of each notch 43 is blocked by each of holding walls 45 (45a and 45b) by fixing of the cover member 24 to the opening portion 23 of the actuator holding portion 15. Moreover, in the present embodiment, thereby, a bearing portion is formed which rotatably supports (the shaft portion 44 of) the proximal end 30a of each rotation shaft 30 to each of the side walls 22a and 22b.

Herein, as shown in FIG. 7, a rotation link 48 rotating integrally with each rotation shaft 30 is fixed to each rotation shaft 30. Furthermore, a connection link 49 connecting each leading end 48a positioned vertically is provided in the leading end 48a of each rotation link 48. Moreover, thereby, the shutter mechanism 11 of the present embodiment has a configuration in which each of vertical movable fins 14A and 14B rotates synchronously.

Furthermore, as shown in FIGS. 8 to 10, in the leading end 30a of each rotation shaft 30, a fitting groove 51 is formed which is opened to a shaft end surface 50 and can be fitted to the output shaft 20 of the actuator 13 so as to be able to transmit the rotation. Moreover, as shown in FIG. 3, the shutter mechanism 11 of the present embodiment is configured so that (the proximal end 30a) of each rotation shaft 30 of each lower movable fin 14B is connected to the actuator 13 as a rotation input portion.

Figure 11:
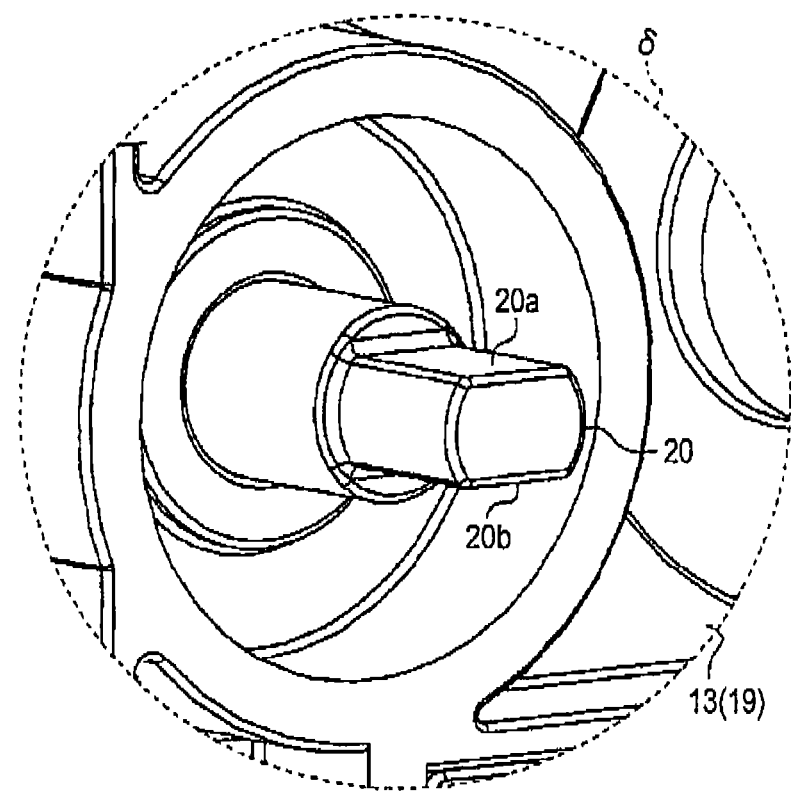
FIG. 11 is a perspective view near an output shaft of an actuator.

Specifically, as shown in FIG. 11, the leading end shape of the output shaft 20 of the actuator 13 is a so-called two surface width shape having flat surfaces 20a and 20b of two surfaces substantially parallel to each other (see FIG. 3, a portion shown in an area 5). Furthermore, as shown in FIG. 10, the fitting groove 51 of each rotation shaft 30 side is formed so that a groove width W is substantially the same as a distance D between both flat surfaces 20a and 20b in the output shaft 20, that is, a thickness of the two surface width-shaped portion. Moreover, in the present embodiment, thereby, there is a configuration in which the output shaft 20 of the actuator 13 is fitted to the fitting groove 51 of each rotation shaft 30 forming the rotation input portion in a relatively non-rotatable manner.

Furthermore, as shown in FIG. 8, the fitting groove 51 has a peripheral surface opening portion 52 that is opened to the peripheral surface of (the proximal end 30a of) each rotation shaft 30 in the state of notching a part in the circumferential direction in each of the flanges 41 and 42. Moreover, each movable fin 14 is placed so that the peripheral surface opening portion 52 is located on the opening end 43a side of the notch 43 forming the bearing portion of each rotation shaft 30, that is, the front side of the frame 12, when the rotation shaft 30 is located at the predetermined rotation position.

Specifically, as shown in FIG. 3, each movable fin 14 is mounted to the frame 12 so that the peripheral surface opening portion 52 of the fitting groove 51 faces the front side of the frame 12 at the rotation position in which the shutter mechanism 11 enters the fully-opened state. Moreover, in the present embodiment, the output shaft 20 of the actuator 13 is fitted to each fitting groove 51 via the peripheral surface opening operation 52 when the actuator 13 is mounted to the actuator holding portion 15.

Furthermore, as shown in FIGS. 3 and 6, the cover member 24 includes a main body portion 53 that is formed in a substantially flat shape so as to cover the opening portion 23 of the actuator holding portion 15, and a pair of turn-up portions 54 (54a and 54b) that protrude and are formed so as to be covered by an outer wall surface 52 of each of the side walls 22a and 22b forming the actuator holding portion 15 from both ends in the width direction of the main body portion 53. Moreover, the cover member 24 is fixed to the frame 12 by the engagement of both of the turn-up portions 54 (54a and 54b) with each of the side walls 22 (22a and 22b).

Figure 12:
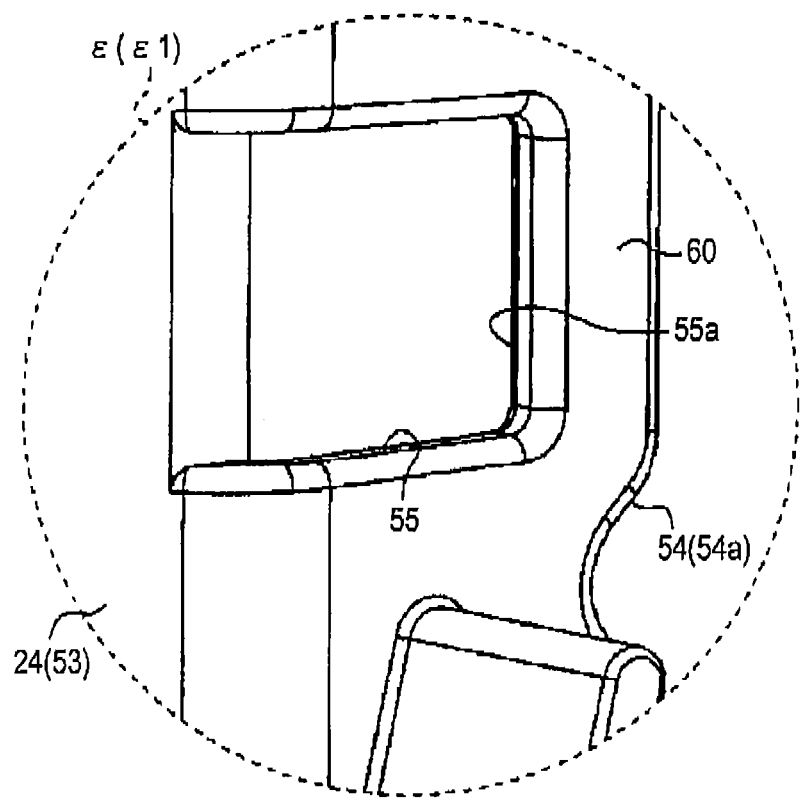
FIG. 12 is a perspective view near an engagement hole.
Figure 13:
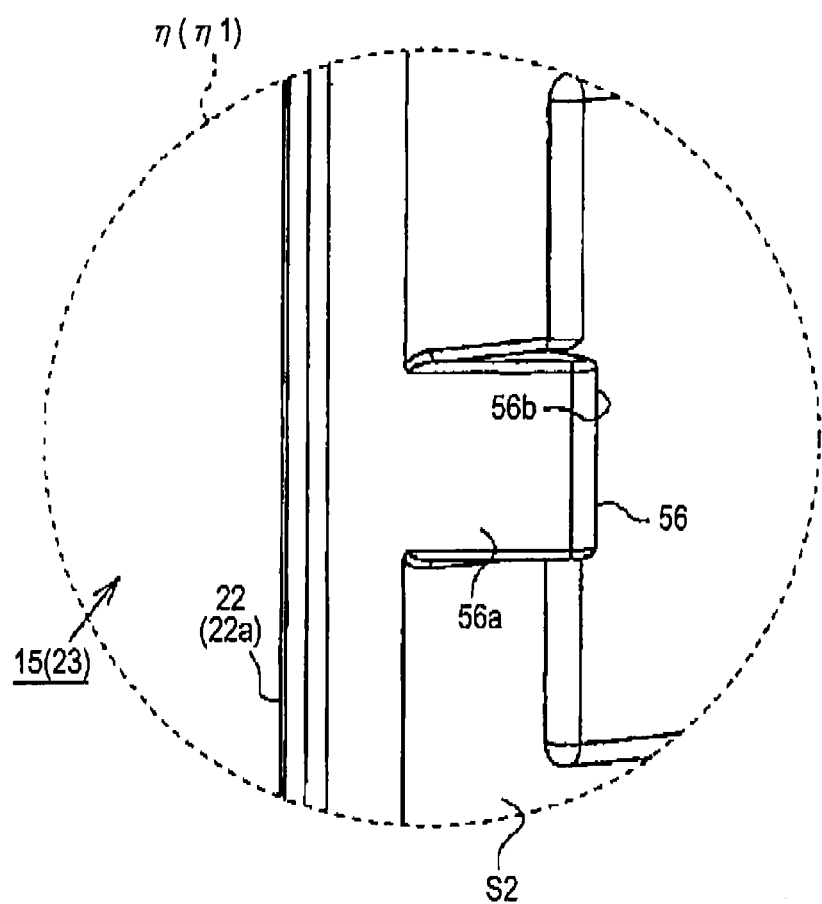
FIG. 13 is a perspective view near an engagement projection portion.

Specifically, the cover member 24 of the present embodiment is formed by an elastically deformable material (resin). Furthermore, as shown in FIG. 12, in each of the turn-up portions 54 of the cover member 24, an engagement hole 55 is formed. Moreover, as shown in FIG. 13, each side wall 22 (22a and 22b) of the frame 12 side is formed with an engagement projection portion 56.

Specifically, as shown in FIG. 6, each engagement projection portion 56 has an inclined surface 56a expanding outward in the width direction (the longitudinal direction in FIG. 6) toward the rear side from the front side of the frame 12 (from the lower side to upper side in FIG. 6), and is formed on the outer wall surface S2 of each of the side walls 22a and 22b. Moreover, each engagement projection portion 56 has a locking wall 56b that is substantially perpendicular to the outer wall surface S2 of each of the side walls 22 (22a and 22b) on the rear side (the upper side in FIG. 6) of the frame 12.

That is, the cover member 24 is mounted to the frame 12, in the state of bending both of the turn-up portions 54 (54a and 54b) in a widening direction along the inclined surface 56a of each engagement projection portion 56 provided in each of the side walls 22 (22a and 22b). Moreover, each engagement projection portion 56 is inserted into each engagement hole 55, whereby both of the turn-up portions 54a and 54b are engaged with the side walls 22a and 22b.

In this manner, in the present embodiment, both of the turn-up portions 54a and 54b of the cover member 24 cooperate with each engagement projection portion 56 of the side walls 22a and 22b sides to form a so-called snap-fit. That is, by locking the locking wall 56b of each engagement projection portion 56 with an inner circumferential surface 55a of a leading end side (the upper side in FIG. 6) in each engagement hole 55, the relative movement of the cover member 24 to the front side of the frame 12 is restricted. Moreover, the cover member 24 serves as a stopper, whereby it is possible to restrict the relative movement of the actuator 13 to the front side of the frame 12 and generate constant holding force.

Furthermore, as shown in FIG. 3, in the present embodiment, each engagement hole 55 and each engagement projection portion 56 are each provided in the upper end portion and the central portion in the corresponding both of the turn-up portions 54 (54a and 54b) and the side walls 22 (22a and 22b) (portions shown in areas ε (ε1 and ε2) and areas η (η1 and η2) in FIG. 3). Furthermore, in a lower framework portion 57 of the frame 12, in the central portion thereof in the width direction, a plurality of (two in the present embodiment) engagement claws 58 projecting upward are provided, and the main body portion 53 of the cover member 24 is provided with an engagement target portion 59 engaged with each engagement claw 58 (an area in FIG. 3). Moreover, the lower end portion of the cover member 24 is fixed to the frame 12 by the engagement between each engagement claw 58 and each engagement target portion 59.

Herein, as shown in FIGS. 6 and 13, in both of the turn-up portions 54a and 54b of the cover member 24, a portion forming the inner circumferential surface 55a of each engagement hole 55 locked to the locking wall 56b of each engagement projection portion 56 is a thin portion 60 having relatively low strength. Moreover, in the present embodiment, when force of separating the cover member 24 from the frame 12 acts due to the vehicle collision, each thin portion 60 is deformed or breaks, whereby the engagement between each engagement hole 55 and each engagement projection portion 56 is released.

Next, an operation of the grill shutter device 10 of the present embodiment will be described.

When a vehicle collision (a front collision) occurs, by coming into contact with the front grill 9 or the like moving back in the grill opening portion 7, the collision load of pressing the frame 12 to the rear side of the vehicle is added into the frame 12 of the grill shutter device 10. Moreover, for example, the grill shutter device 10 comes into contact with the accommodation device in the engine compartment 3 placed in the rear thereof, such as the radiator 5, by moving back due to the collision load.

Herein, in the grill shutter device 10 of the present embodiment, heavy loads such as a motor and a decelerator are concentrated on the actuator 13. That is, unless the collision load directly acts on actuator 13, the actuator 13 maintains the movement state before the collision based on inertia, that is, tries to relatively move forward with respect to the frame 12 moving back due to the input of the collision load. Furthermore, the actuator 13 has a portion that projects rearward rather than the rear end portion (the rear end 16a of the upper framework portion 16) of the frame 12 in the state of being held in the frame 12. Moreover, the portion comes into contact with any part in the grill opening portion 7 earlier than the frame 12, whereby the portion tries to relatively move forward with respect to the frame 12.

The grill shutter device 10 of the present embodiment permits the relative movement of the actuator 13 based on the input of the collision load, specifically, the relative movement toward the front side of the frame 12. Moreover, a configuration is provided in which, at the time of the vehicle collision, for example, when the grill shutter device 10 comes into contact with the accommodation device in the engine compartment 3 placed in the rear, such as the radiator 5, due to the relative movement of the actuator 13, the collision load applied to the accommodation device is alleviated.

That is, as shown in FIG. 6, the actuator 13 has each protrusion portion 31 provided on the inner wall surface S1 of each of the side walls 22a and 22b forming the actuator holding portion 15, and the groove portion 32 corresponding to each protrusion portion 31, and is held in the actuator holding portion 15 in the fitted state of the connection member 33 provided in each side plate portion 19. Moreover, thereby, the relative movement of the actuator 13 is restricted in the directions other than the front-back direction of the frame 12 in which each protrusion portion 31 extends.

However, in the front-back direction of the frame 12 serving as the extension direction of each protrusion portion 31, frictional force generated by the contact of each of the projection portions 35, 36 and 37 provided in each groove portion 32 with each protrusion portion 31 only works as the constant holding force. Thus, the collision load exceeding the holding force generated by each of the projection portions 35, 36 and 37 is input, whereby the relative movement of the actuator 13 toward the front side of the frame 12 is permitted.

Furthermore, as shown in FIG. 8, (the proximal end 30a of) the rotation shaft 30 of each movable fin 14 is formed with the fitting groove 51 that is opened to the shaft end surface 50 and can be fitted to the output shaft 20 of the actuator 13 so as to enable the transmit of the rotation. Moreover, thereby, the rotation shaft 30 of each movable fin 14 functions as the rotation input portion of the shutter mechanism 11. Furthermore, the fitting groove 51 has the peripheral surface opening portion 52 opened to the front side of the frame 12, at the rotation position of each rotation shaft 30 in which the shutter mechanism 11 enters the fully-opened state. Thus, in a case where the vehicle collision occurs when the shutter mechanism 11 is in the fully-opened state, the connection between the output shaft 20 of the actuator 13 and (the proximal end 30a of) each rotation shaft 30 is released without disturbing the relative movement of the actuator 13 toward the front side of the frame 12.

In addition, as shown in FIG. 6, each engagement hole 55 of both of the turn-up portions 54a and 54b provided as the first engagement portion of the cover member 24 side is engaged with each engagement projection portion 56 provided on each of the side walls 22a and 22b as the second engagement portion of the frame 12 side, whereby the cover member 24 is fixed to the frame 12 so as to cover the front side of the actuator 13.

However, the actuator 13 relatively moves in the actuator holding portion 15 to the front side of the frame 12 and presses the cover member 24 fixed to the opening portion 23 based on the collision load, whereby each thin portion 60 of both of the turn-up portions 54a and 54b forming the engagement hole 55 is deformed or breaks. Moreover, thereby, the engagement between each engagement hole 55 and each engagement projection portion 56 is released and the cover member 24 is detached from the opening portion 23 of the actuator holding portion 15. Thus, the detachment of the actuator 13 to the front side of the frame 12 via the opening portion 23 is permitted.

Furthermore, the "detachment" of the cover member 24 and the actuator 13 in this case is the meaning of the broad sense that includes a complete detached state of dropping out from the frame 12 as well as a state where the combination with the frame 12 partially remains.

As mentioned above, according to the present embodiment, the following effects can be achieved.

(1) The grill shutter device 10 includes the shutter mechanism 11 capable of controlling the flow rate of the air based on the opening and closing operation, the frame 12 as the structure configured to support the shutter mechanism 11 within the grill opening portion 7, and the actuator 13 that is held in the frame 12 and performs the opening and closing driving of the shutter mechanism 11. Moreover, the frame 12 has a holding structure capable of relatively moving the actuator 13 to the front side thereof, based on the collision load at the time of the vehicle collision.

That is, the heavy loads such as the motor and the decelerator are concentrated on the actuator 13. Moreover, in many cases, the components of the actuator 13 are hard and have high strength. Thus, by relatively moving the actuator 13 to the front side of the frame 12 at the time of the vehicle collision, for example, when the grill shutter device 10 comes into contact with the accommodation device in the engine compartment 3, such as the radiator 5, placed in the rear, the collision load applied to the accommodation device can be alleviated. Moreover, thereby, at the time of a relatively slight vehicle collision, it is possible to reduce the possibility that the accommodation device in the engine compartment is influenced. As a result, it is possible to alleviate the consumers' burden such as a labor and a time required for the repair and the exchange thereof or the cost.

(2) The cover member 24 configured to cover the front side of the actuator 13 held in the actuator holding portion 15 is affixed to the frame 12. The cover member 24 is provided with the turn-up portions 54 (54a and 54b) having the engagement hole 55, and each of the side walls 22 (22a and 22b) of the frame 12 side is provided with the engagement projection portion 56. Moreover, the cover member 24 is fixed to the opening portion 23 of the actuator holding portion 15 by the engagement between each engagement hole 55 and each engagement projection portion 56, and the engagement between each engagement hole 55 and each engagement projection portion 56 is released based on the collision load.

That is, by covering the front side of the actuator 13 by the cover member 24, the actuator 13 can be protected and thus the aerodynamic performance can be improved. Furthermore, an improvement in design properties can also be planned. Moreover, like the above-mentioned configuration, the cover member 24 is fixed to the frame 12 by the engagement between each engagement hole 55 provided on the cover member 24 side and each engagement projection portion 56 provided on the frame 12 side, whereby the satisfactory assembly properties can be secured.

Furthermore, since the cover member 24 is located on the front side of the actuator 13, it is possible to apply the holding force due to the cover member 24 to the actuator 13. Thereby, high assembly rigidity can be secured at a normal time. Moreover, when the collision load is input, the engagement between each engagement hole 55 and each engagement projection portion 56 is released, whereby the actuator 13 can be relatively moved to the front side of the frame 12.

(3) Each of the side walls 22a and 22b forming the actuator holding portion 15 is provided with the protrusion portion 31 that extends in the front-back direction of the frame 12, respectively. Furthermore, the connection member 33 having the groove portion 32 capable of being fitted to the protrusion portion 31 is affixed to the actuator 13. Moreover, the actuator 13 is held in the actuator holding portion 15 in the state where the protrusion portion 31 and the groove portion 32 are fitted to each other.

According to the above-mentioned configuration, the relative movement of the actuator 13 in directions other than the front-back direction of the frame 12 is restricted. Thereby, the high assembly rigidity at the normal time can be secured. Moreover, in regard to the front-back direction of the frame 12, it is possible to permit the relative movement of the actuator 13 with respect to the frame 12.

(4) In each of the groove portions 32, the projection portions 35 and 36, which vertically face each other and protrudes into the groove so as to interpose each of the protrusion portions 31 fitted to each of the groove portions 32, and the projection portion 37, which presses the top portion 31a of each of the protrusion portions 31 in the width direction, are provided.

According to the above-mentioned configuration, the constant holding force (frictional force) is also generated in the front-back direction of the frame 12, based on the contact between the respective projection portions 35, 36 and 37 and each of the protrusion portions 31. Thereby, high assembly rigidity can be secured at a normal time. Moreover, when the collision load is input, it is possible to relatively move the actuator 13 to the front side of the frame 12 based on the collision load.

(5) In (the proximal end 30a of) the rotation shaft 30 of each movable fin 14, the fitting groove 51 opened to the shaft end surface 50 and capable of being fitted to the output shaft 20 of the actuator 13 so as to be able to transmit the rotation is formed. Moreover, the fitting groove 51 has the peripheral surface opening portion 52 that is opened to the front side of the frame 12, when each rotation shaft 30 is located at the predetermined rotation position.

According to the above-mentioned configuration, the rotation shaft 30 of each movable fin 14 functions as the rotation input portion of the shutter mechanism 11. Furthermore, when the vehicle collision occurs, in a case where each rotation shaft 30 is located at the predetermined rotation position, the connection between the output shaft 20 of the actuator 13 and each rotation shaft 30 is released, without disturbing the relative movement of the actuator 13 to the front side of the frame 12. As a result, it is possible to more smoothly and relatively move the actuator 13 to the front side of the frame 12, based on the collision load.

(6) Each movable fin 14 is mounted to the frame 12 so that the peripheral surface opening portion 52 of the fitting groove 51 faces the front side of the frame 12 at the rotation position in which the shutter mechanism 11 enters the fully-opened state.

That is, at the time of the vehicle collision, needless to say, the situation where the repair and the exchange are not more likely to occur in regard to the accommodation device placed behind the grill shutter device 10 is at the time of the low-speed travelling with the small collision load. Moreover, at the time of the low-speed travelling, in many cases, the shutter mechanism 11 enters the fully-opened state. Thus, according to the above-mentioned configuration, it is possible to effectively enjoy the benefit obtained by relatively moving the actuator 13 to the front side of the frame 12.

(7) The output shaft 20 of the actuator 13 has a so-called two surface width shape that includes flat surfaces 20a and 20b of the two surfaces substantially parallel to the leading end thereof. Moreover, the fitting groove 51 of each rotation shaft 30 side is formed so that the groove width W is substantially equal to the distance D between both of the flat surfaces 20a and 20b in the output shaft 20, that is, the thickness of the two surface width shape portion.

According to the above-mentioned configuration, it is possible to fit the output shaft 20 of the actuator 13 with respect to the fitting groove 51 of each rotation shaft 30 forming the rotation input portion of the shutter mechanism 11 in a relatively non-rotatable manner. Moreover, when the actuator 13 relatively moves to the front side of the frame 12, the output shaft 20 can be detached from the fitting groove 51 via the peripheral surface opening portion 52.

(8) The actuator 13 has a portion projecting rearward rather than the rear end portion (the rear end 16a of the upper framework portion 16) of the frame 12, and is held in the frame 12.

According to the above-mentioned configuration, the rearward projecting portion of the actuator 13 comes into contact with any part in the grill opening portion 7, and thus the actuator 13 is pressed toward to the front side of the frame 12. As a result, it is possible to more smoothly and relatively move the actuator 13 to the front side of the frame 12. Moreover, even when the actuator 13 interferes with the accommodation device in the engine compartment 3 placed in the rear thereof, an acceleration distance until contact is shortened, and thus it is possible to alleviate the influence given to the accommodation device.

(9) The actuator holding portion 15 is provided in the central portion in the width direction of the frame 12. In such a configuration, the actuator 13 held in the frame 12 is more likely to directly come into contact with the accommodation device in the engine compartment 3 placed in the rear. Thus, by applying the configurations of (1) to (8) to this configuration, more remarkable effect can be achieved.

In addition, the above-mentioned embodiment may be modified as follows.

In the above-mentioned embodiment, the air flowing in from the grill opening portion 7 is taken into the engine compartment 3 formed in the vehicle body 2. However, based on the opening and closing operation of the shutter mechanism 11, if there is an inner space of the vehicle body 2 capable of controlling the flow rate of the flowing air, the intake destination of the air may not be the engine compartment 3, without being limited thereto. That is, for example, there may be a space into which the air flowing in from the grill opening portion 7 is introduced, such as the accommodation chamber of the heat exchanger, such as the radiator 5, and this configuration may be applied to a vehicle in which an engine is placed in the rear portion or the center of the vehicle body, or a vehicle in which an engine is not equipped in the in-vehicle space ahead of the vehicle compartment such as an electric car.

In the above-mentioned embodiment, the grill opening portion 7 is formed below the bumper 8. However, this disclosure may also be applied to the grill opening portion 7 that is provided above the bumper 8, without being limited thereto. That is, the front grill 9 may be an upper grill.

In the above-mentioned embodiment, the shutter mechanism 11 performs the opening and closing operation based on the rotation of each movable fin 14. However, the form of the shutter mechanism may be, for example, a so-called slide type, a form in which the movable body oscillates or the like other than such a so-called rotation type, without being limited thereto.

In the above-mentioned embodiment, although the frame 12 is formed in a laterally substantially long square framework shape, the shape thereof is not limited thereto, In the above-mentioned embodiment, although the actuator holding portion 15 is provided in the central portion in the width direction of the frame 12, the arrangement of the actuator holding portion 15 and each movable fin 14 may be arbitrarily changed, In the above-mentioned embodiment, the engagement holes 55 are formed in both of the turn-up portions 54 (54a and 54b) of the cover member 24 side, and the engagement projection portions 56 are formed on each of the side walls 22 (22a and 22b) of the frame 12 side. However, there may be a configuration in which an engagement projection portion corresponding to the engagement projection portion 56 is formed on the cover member 24 side, and an engagement concave portion corresponding to the engagement hole 55 is formed on the frame 12 side, without being limited thereto. Moreover, this disclosure may be embodied in a configuration in which an engagement projection portion and an engagement concave portion are formed in both of the cover member 24 side and the frame 12 side. That is, regardless of the shape, the first engagement portion provided on the cover member side is engaged with the second engagement portion provided on the frame side, whereby the cover member may be fixed to the frame, and the engagement between the first engagement portion and the second engagement portion may be released based on the collision load. Furthermore, the number of the first engagement portion and the second engagement portion may be arbitrarily changed. Moreover, a configuration which does not include the cover member is also not excluded.

In the above-mentioned embodiment, the protrusion portion 31 extending in the front-back direction of the frame 12 is formed on the frame 12 (the side walls 22a and 22b) side, and the connection member 33 having the groove portion 32 capable of being fitted to the protrusion portion 31 is provided in the actuator 13 side. However, there may be a configuration in which the protrusion portion extending in the front-back direction of the frame 12 in the state of being attached to the frame 12 is provided on the actuator 13 side, and the groove portion capable of being fitted to the protrusion portion is provided on the frame 12 side, without being limited thereto. Moreover, this disclosure may be embodied in a configuration in which the protrusion portion and the groove portion are provided in both of the frame 12 side and the actuator 13 side. Furthermore, the number of the protrusion portion and the groove portion may be arbitrarily changed. Moreover, a configuration in which the protrusion portion and the groove portion are not provided is also not excluded.

In the above-mentioned embodiment, each groove portion 32 is formed with the projection portions 35 and 36 which face each other vertically so as to interpose each protrusion portion 31 fitted to each groove portion 32 therebetween and project into the groove, and the projection portion 37 which presses the top portion 31a of each protrusion portion 31 in the width direction. However, a projection portion, which generates the holding force in the front-back direction of the frame 12 by coming into contact with the wall surface of each groove portion 32, may be provided on each protrusion portion 31 side, without being limited thereto. Furthermore, there may be a configuration in which such projection portions are provided in both of each protrusion portion 31 side and each groove portion 32 side. Moreover, a configuration, in which the projection portion configured to generate the holding force in the front-back direction of the frame 12 is not provided in each groove portion 32, is not also excluded.

In the above-mentioned embodiment, in (the proximal end portion 30a of) the rotation shaft 30 of each movable fin 14, the fitting groove 51 capable of being fitted to the output shaft 20 of the actuator 13 so as to be able to transmit the rotation is formed. Moreover, when each rotation shaft 30 is located at the predetermined rotation shaft, there is a configuration in which each rotation shaft 30 constitutes the rotation input portion of the shutter mechanism 11 by having the peripheral surface opening portion 52 opened to the front side of the frame 12. However, if the rotation input portion is connected to the output shaft 20 of the actuator 13 so as to be able to transmit the rotation, and is able to release the connection with the output shaft 20, without disturbing the relative movement of the actuator 13 toward the front side of the frame 12 at the predetermined rotation position, the rotation input portion may have any configuration, without being limited thereto.

Furthermore, in the above-mentioned embodiment, each movable fin 14 is mounted to the frame 12 so that the peripheral surface opening portion 52 of the fitting groove 51 faces the front side of the frame 12 at the rotation position in which the shutter mechanism 11 enters the fully-opened state. However, there may be a configuration in which the peripheral surface opening portion 52 of the fitting groove 51 faces the front side of the frame 12 at the rotation position in which the shutter mechanism 11 enters the fully-closed state or at an intermediate rotation position that belongs to none of the positions, without being limited thereto. That is, the predetermined rotation position capable of releasing the connection with the output shaft 20 may be arbitrarily changed.

In the above-mentioned embodiment, the output shaft 20 of the actuator 13 has a so-called two surface width shape that includes the flat surfaces 20a and 20b of two surfaces substantially parallel to the leading end thereof. However, for example, a shape may be adopted which has a cross section of square or hexagonal shape capable of being fitted to the fitting groove 51 in the relatively non-rotatable manner and capable of being detached from the peripheral surface opening portion 52 to the front side of the frame 12, without being limited thereto.

In the above-mentioned embodiment, the actuator 13 has the portion projecting rearward rather than the rear end portion (the rear end portion 16a of the upper framework portion 16) of the frame 12, and is held in the frame 12. However, there may be a configuration in which the rear end portion of the actuator 13 is located ahead of the rear end portion of the frame 12, without being limited thereto.

Therefore, aspects of this disclosure are further described below.

According to a first aspect of this disclosure, there is provided a grill shutter device configured to be placed to a grill opening portion of a vehicle body front portion including a shutter mechanism controlling a flow rate of air flowing into a vehicle body from the grill opening portion of the vehicle body front portion by an opening and closing operation, a frame configured to support the shutter mechanism within the grill opening portion, an actuator that is held in the frame and performs the opening and closing driving of the shutter mechanism, and a holding structure capable of relatively moving the actuator to the front side of the frame, based on the collision load at the time of the vehicle collision.

That is, normally, heavy loads such as a motor and a decelerator are concentrated on the actuator. Moreover, in many cases, components of the actuator are hard and have high strength. Thus, with such a configuration, by relatively moving the actuator to the front side of the frame at the time of the vehicle collision, when the grill shutter device comes into contact with the accommodation device such as a heat exchanger placed in the rear, the collision load applied to the accommodation device can be alleviated. Moreover, thereby, at the time of a relatively slight vehicle collision, it is possible to reduce the possibility that the accommodation device is influenced. As a result, it is possible to alleviate the consumers' burden such as labor and time required for the repair and the exchange thereof or the cost.

According to a second aspect of this disclosure, the grill shutter device may include a cover member that covers the front side of the actuator by being affixed to the frame, the cover member may be fixed to the frame by the engagement between a first engagement portion provided on the cover member side with a second engagement portion provided on the frame side, and the engagement between the first engagement portion with the second engagement portion may be released based on the collision load.

That is, by covering the front side of the actuator with the cover member, the actuator can be protected and aerodynamic performance can be improved. Furthermore, an improvement in design properties can be planned. Moreover, like the above-mentioned configuration, by the engagement between the first engagement portion provided on the cover member side with the second engagement portion provided on the frame side, the cover member is fixed to the frame, and thus favorable assembly properties can be secured.

Furthermore, since the cover member is located on the front side of the actuator, holding force due to the cover member can be applied to the actuator. Thereby, high assembly rigidity can be secured at a normal time. Moreover, when the collision load is input, the engagement between the first engagement portion with the second engagement portion is released, whereby the actuator can be relatively moved to the front side of the frame.

According to a third aspect of this disclosure, at least one of the frame and the actuator may be formed with a protrusion portion that extends in a front-back direction of the frame in a state where the actuator is held in the frame, and the other thereof may be formed with a groove portion fitted to the protrusion portion.

According to the above-mentioned configuration, the relative movement of the actuator in directions other than the front-back direction of the frame, in which the protrusion portion extends, is restricted. Thereby, high assembly properties at a normal time can be secured. Moreover, in regard to the front-back direction of the frame, it is possible to permit the relative movement of the actuator with respect to the frame.

According to a fourth aspect of this disclosure, at least one of the protrusion portion and the groove portion may be formed with a projection portion that generates the holding force in the front-back direction by coming into contact with the other thereof within the groove portion.

According to the above-mentioned configuration, it is also possible to apply constant holding force to the actuator in the front-back direction of the frame in which the protrusion portion extends. Thereby, high assembly rigidity can be secured at a normal time. Moreover, when the collision load is input, it is possible to relatively move the actuator to the front side of the frame, based on the collision load.

According to a fifth aspect of this disclosure, the shutter mechanism may be provided with a rotation input portion that is connected to an output shaft of the actuator so as to be able to transmit the rotation, and is able to release the connection with the output shaft without disturbing the relative movement of the actuator to the front side at a predetermined rotation position.

According to a sixth aspect of this disclosure, the rotation input portion may be provided with a fitting groove that is opened to the front side at the predetermined rotation position, and the output shaft may be formed so as to be able to be fitted to the fitting groove in a relatively non-rotatable manner and so as to be able to be detached from the opening portion of the front side.

According to each of the above-mentioned configurations, the connection between the actuator with the shutter mechanism can be released based on the collision load. As a result, it is possible to more smoothly and relatively move the actuator to the front side of the frame, based on the collision load.

According to a seventh aspect of this disclosure, the actuator may have a portion projecting rearward from the rear end portion of the frame and may be held in the frame.

According to the above-mentioned configuration, a rearward projecting portion of the actuator comes into contact with any part in the grill opening portion, and thus the actuator is pressed toward to the front side of the frame. As a result, it is possible to more smoothly and relatively move the actuator to the front side of the frame. Moreover, even when the actuator interferes with the accommodation device placed in the rear thereof, an acceleration distance until contact is shortened, and thus it is possible to alleviate the influence given to the accommodation device.

According to an eighth aspect of this disclosure, the actuator may be held in a central portion in a width direction in the frame.

In such a configuration, the actuator held in the frame is more likely directly to come into contact with the accommodation device placed in the rear. Thus, by applying each of the above-mentioned aspects to this configuration, a more remarkable effect can be obtained.

According to this disclosure, it is possible to provide the grill shutter device capable of alleviating the collision load applied to the accommodation device of the inner portion of the vehicle body placed in the rear, at the time of the vehicle collision.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A grill shutter device configured to be placed to a grill opening portion of a vehicle body front portion comprising:
a shutter mechanism controlling a flow rate of air flowing into a vehicle body from the grill opening portion of the vehicle body front portion by an opening and closing operation;
a frame configured to support the shutter mechanism within the grill opening portion;
an actuator that is held in the frame and performs the opening and closing driving of the shutter mechanism;
a holding structure configured to relatively move the actuator to a front side of the frame, based on a collision load at a time of a vehicle collision; and
a cover member that covers a front side of the actuator by being affixed to the frame,
wherein the cover member is fixed to the frame by an engagement between a first engagement portion provided on the cover member side and a second engagement portion provided on the frame side, and the engagement between the first engagement portion and the second engagement portion is released based on the collision load.

2. The grill shutter device according to claim 1, wherein at least one of the frame and the actuator is formed with a protrusion portion that extends in a front-back direction of the frame in a state where the actuator is held in the frame, and the other thereof is formed with a groove portion fitted to the protrusion portion.

3. The grill shutter device according to claim 1, wherein the shutter mechanism is provided with a rotation input portion that is connected to an output shaft of the actuator so as to be able to transmit the rotation, and is able to release the connection with the output shaft, without disturbing the relative movement of the actuator to the front side at a predetermined rotation position.

4. The grill shutter device according to claim 1, wherein the actuator has a portion projecting rearward from a rear end portion of the frame, and is held in the frame.

5. The grill shutter device according to claim 1, wherein the actuator is held in a central portion in a width direction in the frame.

6. A grill shutter device configured to be placed to a grill opening portion of a vehicle body front portion comprising:
a shutter mechanism controlling a flow rate of air flowing into a vehicle body from the grill opening portion of the vehicle body front portion by an opening and closing operation;
a frame configured to support the shutter mechanism within the grill opening portion;
an actuator that is held in the frame and performs the opening and closing driving of the shutter mechanism; and
a holding structure configured to relatively move the actuator to a front side of the frame, based on a collision load at a time of a vehicle collision,
wherein at least one of the frame and the actuator is formed with a protrusion portion that extends in a front-back direction of the frame in a state where the actuator is held in the frame, and the other thereof is formed with a groove portion fitted to the protrusion portion.

7. The grill shutter device according to claim 6, wherein at least one of the protrusion portion and the groove portion is formed with a projection portion that generates holding force in the front-back direction by coming into contact with the other thereof within the groove portion.

8. The grill shutter device according to claim 6, wherein the shutter mechanism is provided with a rotation input portion that is connected to an output shaft of the actuator so as to be able to transmit the rotation, and is able to release the connection with the output shaft, without disturbing the relative movement of the actuator to the front side at a predetermined rotation position.

9. The grill shutter device according to claim 7, wherein the shutter mechanism is provided with a rotation input portion that is connected to an output shaft of the actuator so as to be able to transmit the rotation, and is able to release the connection with the output shaft, without disturbing the relative movement of the actuator to the front side at a predetermined rotation position.

10. The grill shutter device according to claim 6, wherein the actuator has a portion projecting rearward from a rear end portion of the frame, and is held in the frame.

11. The grill shutter device according to claim 7,
wherein the actuator has a portion projecting rearward from a rear end portion of the frame, and is held in the frame.

12. The grill shutter device according to claim 6,
wherein the actuator is held in a central portion in a width direction in the frame.

13. The grill shutter device according to claim 7,
wherein the actuator is held in a central portion in a width direction in the frame.

14. A grill shutter device configured to be placed to a grill opening portion of a vehicle body front portion comprising:
- a shutter mechanism controlling a flow rate of air flowing into a vehicle body from the grill opening portion of the vehicle body front portion by an opening and closing operation;
- a frame configured to support the shutter mechanism within the grill opening portion;
- an actuator that is held in the frame and performs the opening and closing driving of the shutter mechanism; and
- a holding structure configured to relatively move the actuator to a front side of the frame, based on a collision load at a time of a vehicle collision, wherein the shutter mechanism is provided with a rotation input portion that is connected to an output shaft of the actuator so as to be able to transmit the rotation, and is able to release the connection with the output shaft, without disturbing the relative movement of the actuator to the front side at a predetermined rotation position.

15. The grill shutter device according to claim 14,
wherein the rotation input portion is provided with a fitting groove that is opened to the front side at the predetermined rotation position, and the output shaft is formed so as to be able to be fitted to the fitting groove in a relatively non-rotatable manner, and so as to be able to be detached from the opening portion of the front side.

16. The grill shutter device according to claim 14,
wherein the actuator has a portion projecting rearward from a rear end portion of the frame, and is held in the frame.

17. The grill shutter device according to claim 15,
wherein the actuator has a portion projecting rearward from a rear end portion of the frame, and is held in the frame.

* * * * *